(12) United States Patent
Geyer et al.

(10) Patent No.: US 12,214,719 B2
(45) Date of Patent: Feb. 4, 2025

(54) SELECTIVELY DEPLOYABLE INDICATOR ARM APPARATUS

(71) Applicant: BUS SAFETY INC., Mocksville, NC (US)

(72) Inventors: Robert Geyer, Bermuda Run, NC (US); Scott Geyer, Mocksville, NC (US); Scott Culbertson, Clemmons, NC (US); David Jennings, Pfafftown, NC (US); Rich Pater, Lexington, NC (US)

(73) Assignee: BUS SAFETY INC., Mocksville, NC (US)

( * ) Notice: Subject to any disclaimer, the term of this patent is extended or adjusted under 35 U.S.C. 154(b) by 0 days.

(21) Appl. No.: 18/502,483

(22) Filed: Nov. 6, 2023

(65) Prior Publication Data

US 2024/0149779 A1   May 9, 2024

Related U.S. Application Data

(60) Provisional application No. 63/383,014, filed on Nov. 9, 2022.

(51) Int. Cl.
*B60Q 1/26* (2006.01)
*B60Q 1/00* (2006.01)
(Continued)

(52) U.S. Cl.
CPC ......... *B60Q 1/2657* (2013.01); *B60Q 1/0088* (2013.01); *B60Q 1/32* (2013.01);
(Continued)

(58) Field of Classification Search
CPC ...... B60Q 1/2657; B60Q 1/0088; B60Q 1/32; B60Q 1/503; B60Q 1/547; B60Q 2800/30
See application file for complete search history.

(56) References Cited

U.S. PATENT DOCUMENTS 2,252,529 A * 8/1941 Simpkins ................. B60Q 1/44
116/39
4,825,192 A * 4/1989 Wells ...................... B60R 19/38
280/765.1
(Continued)

FOREIGN PATENT DOCUMENTS

CA    3106330 A1   1/2020
GB    2468005 A    8/2010
(Continued)

OTHER PUBLICATIONS

CPD Lite Tile-6MM LED Light Panel. Datasheet [online]. 2 pages. CPD Lighting, no date [retrieved on Aug. 4, 2023]. Retrieved from the Internet: <URL: https://cpdlighting.com/led-light-panels/led-panels-for-stained-glass/>.
(Continued)

*Primary Examiner* — Son T Le
*Assistant Examiner* — Tania Courson
(74) *Attorney, Agent, or Firm* — NK Patent Law

(57) ABSTRACT

An indicator arm apparatus includes a mount unit configured to be secured to a vehicle, a first pivotal arm assembly having a first indicator and first hinge unit configured to move the first indicator from a retracted position to a deployed position, a second pivotal arm assembly having a second indicator and second hinge unit configured to move the second indicator from a stored position to an extended position, a first drive unit operably linked to at least one of the pivotal arm assemblies to move the respective indicator between respective positions, and a control unit in operable communication with the first drive unit to provide signals to selectively move at least one indicator. Each hinge unit comprises a pivotally affixed portion that is also affixed to an indicator to pivot the indicator between respective positions.

14 Claims, 15 Drawing Sheets

(51) Int. Cl.
*B60Q 1/32* (2006.01)
*B60Q 1/50* (2006.01)

(52) U.S. Cl.
CPC .............. *B60Q 1/503* (2013.01); *B60Q 1/547* (2022.05); *B60Q 2800/30* (2022.05)

(56) References Cited

U.S. PATENT DOCUMENTS

| | | | | |
|---|---|---|---|---|
| 5,493,269 | A * | 2/1996 | Durley | .................. G01S 13/931 |
| | | | | 340/901 |
| 6,094,849 | A | 8/2000 | Phillips | |
| 6,099,933 | A | 8/2000 | Lamparter | |
| 7,005,973 | B2 | 2/2006 | Haigh | |
| 7,474,201 | B2 * | 1/2009 | Swanger | .............. B60Q 1/2692 |
| | | | | 40/430 |
| 7,791,464 | B1 * | 9/2010 | Giddings | ............... B60Q 1/525 |
| | | | | 340/471 |
| 9,245,465 | B1 | 1/2016 | Geyer | |
| 10,062,309 | B1 * | 8/2018 | Ringer | ................... B60Q 1/547 |
| 10,703,266 | B1 * | 7/2020 | Butler | ..................... E01F 9/662 |
| D932,930 | S | 10/2021 | Smith | |
| 11,170,673 | B2 | 11/2021 | Gamble | |
| 11,348,491 | B2 | 5/2022 | Gamble | |
| 11,414,010 | B2 * | 8/2022 | Gucwa | ................... G09F 19/02 |
| D968,003 | S | 10/2022 | Gamble | |
| 11,479,166 | B2 * | 10/2022 | Ringer | ................... H04N 7/188 |
| 11,554,715 | B2 | 1/2023 | Yudelevich | |
| 11,820,283 | B2 | 11/2023 | Yudelevich | |
| 2007/0089345 | A1 | 4/2007 | Ericson | |
| 2008/0169918 | A1 * | 7/2008 | Vidri | ........................ B60Q 1/50 |
| | | | | 340/487 |
| 2011/0219648 | A1 | 9/2011 | James | |
| 2021/0221283 | A1 | 7/2021 | Yudelevich | |
| 2022/0176875 | A1 | 6/2022 | Gucwa | |
| 2022/0319361 | A1 | 10/2022 | Gamble | |
| 2023/0089438 | A1 * | 3/2023 | Hatoum | ............... B60Q 1/2657 |
| | | | | 248/550 |
| 2023/0226968 | A1 * | 7/2023 | Beck | .................... B60Q 1/2692 |
| | | | | 340/433 |
| 2023/0391251 | A1 * | 12/2023 | Thompson | ........... B60Q 1/2657 |

FOREIGN PATENT DOCUMENTS

| | | | | |
|---|---|---|---|---|
| GB | 2551105 | A * | 12/2017 | ............... B60Q 1/26 |
| WO | 2020010470 | A1 | 1/2020 | |

OTHER PUBLICATIONS

First Light Safety Products. "Fully Illuminated Stop Arm the Only Stop Arm That Always Looks Like a Stop Sign" [online]. 2023 [retrieved on Feb. 5, 2024]. Retrieved from the Internet: <URL: https://www.firstlightsafety.com/product-category/fully-illuminated-stop-arm/>.

* cited by examiner

FIG. 6

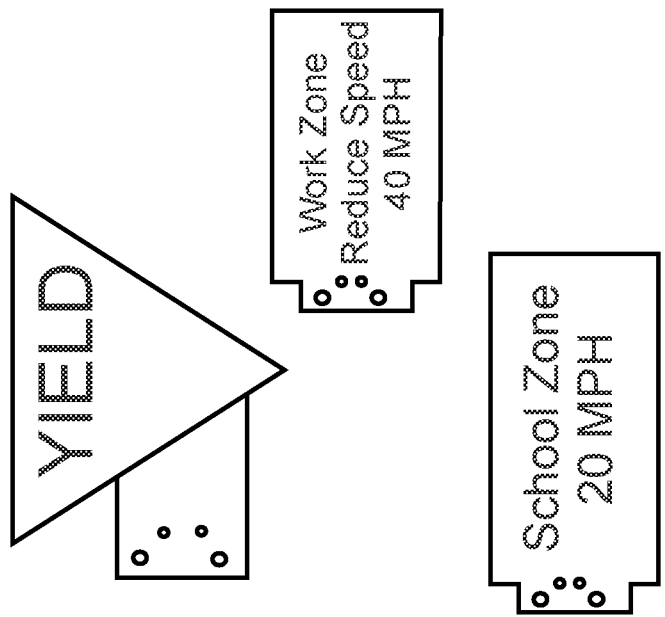
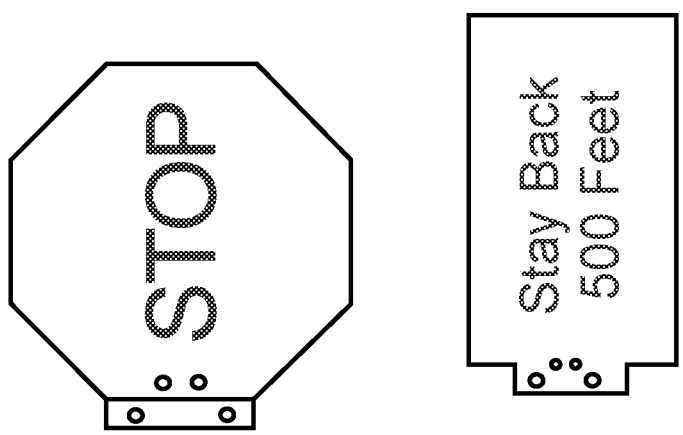
FIG. 14

SELECTIVELY DEPLOYABLE INDICATOR ARM APPARATUS

CROSS-REFERENCE TO RELATED APPLICATIONS

This application claims priority to U.S. Provisional Patent Application No. 63/383,014 which was filed on Nov. 9, 2022, the entire contents of which is hereby incorporated by reference in its entirety.

TECHNICAL FIELD

The present disclosure relates to the field of safety devices, and, more particularly, to indicator arm apparatuses installed on vehicles that selectively deploy one or more of a plurality of indicators to signal and inform persons outside the vehicles.

BACKGROUND

It is often necessary for certain types of vehicles to have signals or information that provide notice to others in the vicinity about the vehicle's purpose, plans, or a required act in relation to the vehicle. A particular example is the requirement for a school bus to have a stop signal arm that requires drivers to stop. Indeed, federal regulations require a device that can be extended outward from the side of a school bus to provide a signal to other motorists not to pass the bus because it has stopped to load or discharge passengers. Traditionally, these devices have comprised a stop sign hinged to and pivoted out a short distance from the side of the bus. In recent years, these devices have been adapted to include lights to make them more visible. However, even with adaptions to make the signs more visible, motorists often fail to stop, as required by law. In an effort to increase awareness of motorists, there have been several additional approaches to improving the visibility of signs deployed from vehicles, like school buses. For example, U.S. Pat. No. 9,245,465 to Geyer et al. discloses a stop arm signal device that extends further into the adjacent lane to reduce instances in which motorists pass a stopped school bus. Moreover, the device has a break-away portion as part of the frame of the stop arm signal device to further help reduce damage to the device from collisions.

Although an extended stop arm is certainly helpful to increase awareness of an indicator deploying from a vehicle, there are certain instances where deployment of an extended stop arm might not be desirable. For example, a school bus might stop in an alley or on a street with obstructions where the extended stop arm might be more likely to strike or encounter an obstruction. Deployment of an extended stop arm in such instances, could result in damage to some portion of the apparatus. Accordingly, there remains an unmet need to provide an indicator arm apparatus which accommodates the selective deployment of an indicator at a short distance from the side of a vehicle in one instance and to extend an additional indicator at an extended distance from a vehicle in another instance. Specifically, there is an unmet need for two separate arm assemblies, a traditional shorter and an extended, which can each be deployed independently or in concert so a user of the apparatus can selectively deploy an extended arm assembly having an indicator or a shorter arm assembly having an indicator or both.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

In view of the above, certain aspects of the presently disclosed device allow a user to selectively deploy a first indicator into a space adjacent (proximal) to a vehicle and selectively deploy a separate second indicator into a space further out (distal) from a vehicle than that of the first indicator, independently or together. Thereby, in one or more embodiments, a user selects to deploy indicators into both a proximal space and a distal space, providing the benefit of two indicators including enhanced notice or instructions to individuals in the area. However, in one or more embodiments, a user selects to deploy a single indicator, such as the first indicator into the proximal space. In such an embodiment, selective deployment of the first indicator into a proximal space would not require an unobstructed deployment path in the distal space. Thereby, in embodiments, the apparatus allows for selective deployment of indicators in both tighter size-restrictive areas, such as alleys or narrow lanes, and in more open less size-restricted areas.

According to one or more embodiments an indicator arm apparatus is provided that comprises a mount unit comprising at least one base plate configured to be installed on a vehicle, a first pivotal arm assembly including a first indicator, a second pivotal arm assembly including a second indicator, and a first drive unit operably linked to at least one of the first pivotal arm assembly and the second pivotal arm assembly to move the respective indicator between respective positions, and a control unit in operable communication with the first drive unit and configured to provide signals to at least the first drive unit to selectively move one or more of the first indicator and second indicator. In embodiments, the first pivotal arm assembly includes a first hinge unit having a fixed portion secured to the mount unit and having a swing portion pivotally affixed to the fixed portion at one end and to the first indicator at and opposed end, and the first hinge unit is configured to pivot the first indicator from a retracted position to a deployed position such that a portion of the first indicator is disposed further from the mount unit in the deployed position thereof. In embodiments, the second pivotal arm assembly includes a second hinge unit having an anchor portion secured to the mount unit and having a moving portion pivotally affixed to the anchor portion at one end and to the second indicator at and opposed end, and the second hinge unit is configured to pivot the second indicator from a stored position to an extended position such that a portion of the second indicator is disposed a distance from the mount unit in the extended position greater than the distance associated with the first indicator and the mount unit in the deployed position thereof.

According to one or more additional embodiments, the mount unit comprises a first base plate and wherein the fixed portion and the anchor portion are each affixed to the first base plate. Thereby, both pivotal assemblies can be affixed to a single base plate as part of a mount unit. In embodiments, the apparatus further comprises an enclosure configured to affix to the first base plate and surround at least a portion of both the first dive unit and control unit. Thereby, portions of the device can be disposed in an enclosure to protect them from weather, damage, or contact.

In certain embodiments, an indicator arm apparatus also comprises a coupling unit, wherein the control unit is in operable communication with the coupling unit and the coupling unit is affixed to the first base plate and selectively couples portions of the second pivotal arm assembly to the first drive unit such that the first drive unit is operably linked to both the first pivotal arm assembly and second pivotal arm assembly, upon receipt of certain of the signals from the control unit. In further embodiments, the first drive unit, when coupled to the second pivotal arm assembly, moves the first indicator between the retracted position and the deployed positions and moves the second pivotal arm assembly between the stored and extended positions. Thereby, a single drive unit can selectively cause movement of both indicators of both pivotal arm assemblies when the coupling unit is engaged and only cause movement of a single indicator or a single arm assembly when the coupling unit is disengaged.

In other embodiments, an indicator arm apparatus also comprises a second drive unit, wherein the control unit is in operable communication with the second drive unit and configured to provide signals to the second drive unit, wherein the first drive unit is operably linked to the first pivotal arm assembly and configured to move the first indicator between the retracted position and the deployed position upon receipt of certain of the signals from the control unit; and wherein the second drive unit is operably linked to the second pivotal arm assembly and configured to move the second indicator between the stored position and the extended position upon receipt of certain of the signals from the control unit. Thereby, each pivotal arm assembly is affixed to a separate drive unit to provide motion which pivotally moves each indicator between respective positions.

In embodiments, the indicator arm apparatus further comprises at least one sensor in communication with the control unit, wherein the control unit selectively operates one or more of the first drive unit and the second drive unit based on signals received from the at least one sensor and wherein the at least one sensor is configured to detect an obstruction disposed in a path of movement of the second indicator between the stored position and the extended position. Thereby, the apparatus can decide not to deploy one of or both the indicators based on the presence of something in the deployment path.

In certain embodiments, the mount unit comprises a first base plate and a second base plate and the control unit comprises a first controller and second controller coupled electronically to the first controller. In particular embodiments, the first controller is in operable communication with the first drive unit and the second controller is in operable communication with the second drive unit and the first controller is disposed on the first base plate and within a first enclosure affixed to the first base plate and the second controller is disposed on the second base plate and within a second enclosure affixed to the second base plate. Thereby, the second pivotal arm assembly and the second controller may be a separate modular part of the apparatus from the first pivotal arm assembly and the first controller. In additional embodiments, the first controller and second controller are electronically coupled through a quick release electrical connector. Thereby, portions of the apparatus may be easily connected and disconnected to aid in installation and replacement, in case of failure.

In other embodiments, the mount unit comprises a first base plate and a second base plate and wherein a portion of the first drive unit is affixed to the first base and a portion of the second drive unit is affixed to the second base plate. Thereby, each drive unit may be separately secured to a portion of the vehicle, to provide the ability for the apparatus to accommodate different linkages, having different sizes or components, between a drive unit and a pivotal arm assembly, increasing the overall modularity and usefulness of the present apparatus.

In further embodiments, the first drive unit comprises a linear actuator comprising a piston end, wherein, when the piston end is extended away from a body of the linear actuator, either the first indicator moves from the retracted position to the deployed position or the second indicator moves from the stored position to the extended position. In a specific embodiment, at least one of the swing portion or moving portion pivots when the piston end is extended away from the body of the linear actuator. Thereby, the present apparatus accommodates a type of linkage between the drive unit and the hinge unit that provides the specified motion of the indicator, and hinge unit, based on the specific motion of a portion of the drive unit.

In an alternative embodiment, the first drive unit comprises a linear actuator comprising a piston, wherein, when the piston is retracted into a body of the linear actuator, either the first indicator moves from the retracted position to the deployed position or the second indicator moves from the stored position to the extended position. In a specific embodiment, at least one of the swing portion or moving portion pivots when the piston end is retracted into the body of the linear actuator. Thereby, the present apparatus accommodates a type of linkage between the drive unit and the hinge unit that provides the specified motion of the indicator, and hinge unit, based on the specific motion of a portion of the drive unit.

In various embodiments, the drive unit, such as a linear actuator, might be of a type that is pneumatic, hydraulic, or electric.

In particular embodiments, the first indicator is removably affixed to the second end of the swing portion. In similar embodiments, the second indicator is removably affixed to the second end of the moving portion. Thereby, one or both of the indicators is replaceable in the even either is damaged, worn, or malfunctioning. Moreover, the removability of each indicator allows the interchange with indicators having different designs, features, functionality, or characteristics, allowing the apparatus to be used for a variety of purposes as well as upgradable.

In various embodiments, the moving portion comprises an arm having an outline of connected frame members between the first end of the moving portion and the second end of the moving portion, the arm surrounding and defining an open section in a cross-sectional plane passing through the frame members, the second indicator is affixed to one of the frame members at the second end of the moving portion on an opposed side of the open section from the first end of the moving portion and a portion of the first pivotal arm assembly is disposed through the open section when the first indicator is in the deployed position and the second indicator is in the stored position. Thereby, the arm allows the second indicator to be deployed to a distance further away from the vehicle than the first indicator and still allows for the deployment of the first indicator alone, even when the second is not deployed at the same time.

In particular embodiments, at least a portion of the frame members are adjustable such that the distance between the second indicator and the anchor portion is adjustable. Thereby, the second indicator can be disposed at an adjustable distance from the vehicle when deployed, allowing the apparatus to be customizable to accommodate variable situations outside of the vehicle. For example, the arm may be adjustable to extend a stop indicator across more than a single lane of a road to notify traffic in multiple lanes to stop and making the stop indicator easier to see further from the vehicle.

In certain embodiments, the arm has a first section having a side disposed adjacent the anchor portion of the second hinge unit and defining the open section and the arm further has a second section disposed between the second end of the moving portion and the open section with the second section removably connected to the first section. In at least one embodiment, the first section and second section of the arm are removably connected through plastic connectors configured to provide separation of second section from the first section when at least one of the second section and second indicator is impacted with a predefined force. Thereby, the arm itself might have separate portions which can be replaced or changed to accommodate various uses, and which can break away when impacted to prevent damage to the apparatus, as a whole.

In various embodiments, the first indicator and second indicator comprise lights in operable communication with the control unit and at least a portion of the frame members define a channel carrying wires connecting the lights of the second indicator and the control unit. Thereby, the visibility of each indicator can be enhanced by having lights and the power can be routed to those lights through channels which protect the wiring.

In further embodiments, the indicator arm apparatus comprises at least one illumination device configured to illuminate each of the indicators. In certain instances, the illumination device is attached to the exterior of each of the indicators. In further instances, the illumination device is disposed adjacent to the edge of each of the indicators. In other instances, the illumination device is disposed internally in each of the indicators. In another embodiment, the indicators include an internal illumination device that illuminates opposed sides of each indicator. Thereby, the lighting of each indicator can be provided in a specific way to enhance the visibility thereof while also providing the ability to easily attach, access, replace, or protect the illumination device relative to the indicator.

In certain embodiments, the indicator arm apparatus includes a heating element disposed in thermal communication with one or more drive units, a temperature sensor, and a control unit that is in communication with the temperature sensor and operably linked to the heating element so that the control unit operates the heating element in response to a signal from the temperature sensor. Thereby, the heating element can prevent malfunction of the apparatus at particularly low temperatures.

In particular embodiments, the indicator arm apparatus includes one or both pivotal arm assemblies being removably secured to the base mount to allow for replacement thereof.

In additional embodiments, the first indicator is disposed in a plane parallel to a surface of the base mount in the retracted position. In a similar embodiment, the second indicator is disposed in a plane parallel to a surface of the base mount in the stored position. Thereby, the position of each indicator can help the indicator to cut through the air during vehicle movement. In another embodiment, the first indicator is disposed in a plane perpendicular to the surface of the base mount in the deployed position. In a similar embodiment, the second indicator is disposed in a plane perpendicular to a surface of the base mount in the extended position. Thereby, the position of each indicator can help ensure visibility to other vehicles approaching from the front or rear of the vehicle to which the apparatus is secured.

BRIEF DESCRIPTION OF THE DRAWINGS

The foregoing, as well as the following Detailed Description, is better understood when read in conjunction with the appended drawings. For the purposes of illustration, there is shown in the drawings exemplary embodiments; however, the presently disclosed subject matter is not limited to the specific methods and instrumentalities disclosed.

The embodiments illustrated, described, and discussed herein are illustrative of the present invention. As these embodiments of the present invention are described with reference to illustrations, various modifications or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

FIG. 6 illustrates a side elevation view of an indicator arm apparatus according to one or more embodiments having the first and second indicators removed and the lid removed on the enclosure affixed to the first base plate of the mount unit to aid illustration of the linear actuator drive unit including the arrangement of the piston so it extends away from the body and away from the hinge unit, and with the second drive unit affixed to a second separate base plate of the mount unit;

FIG. 14 illustrates a variety of indicator options of an indicator arm apparatus according to one or more embodiments.

DETAILED DESCRIPTION

Figure 1:
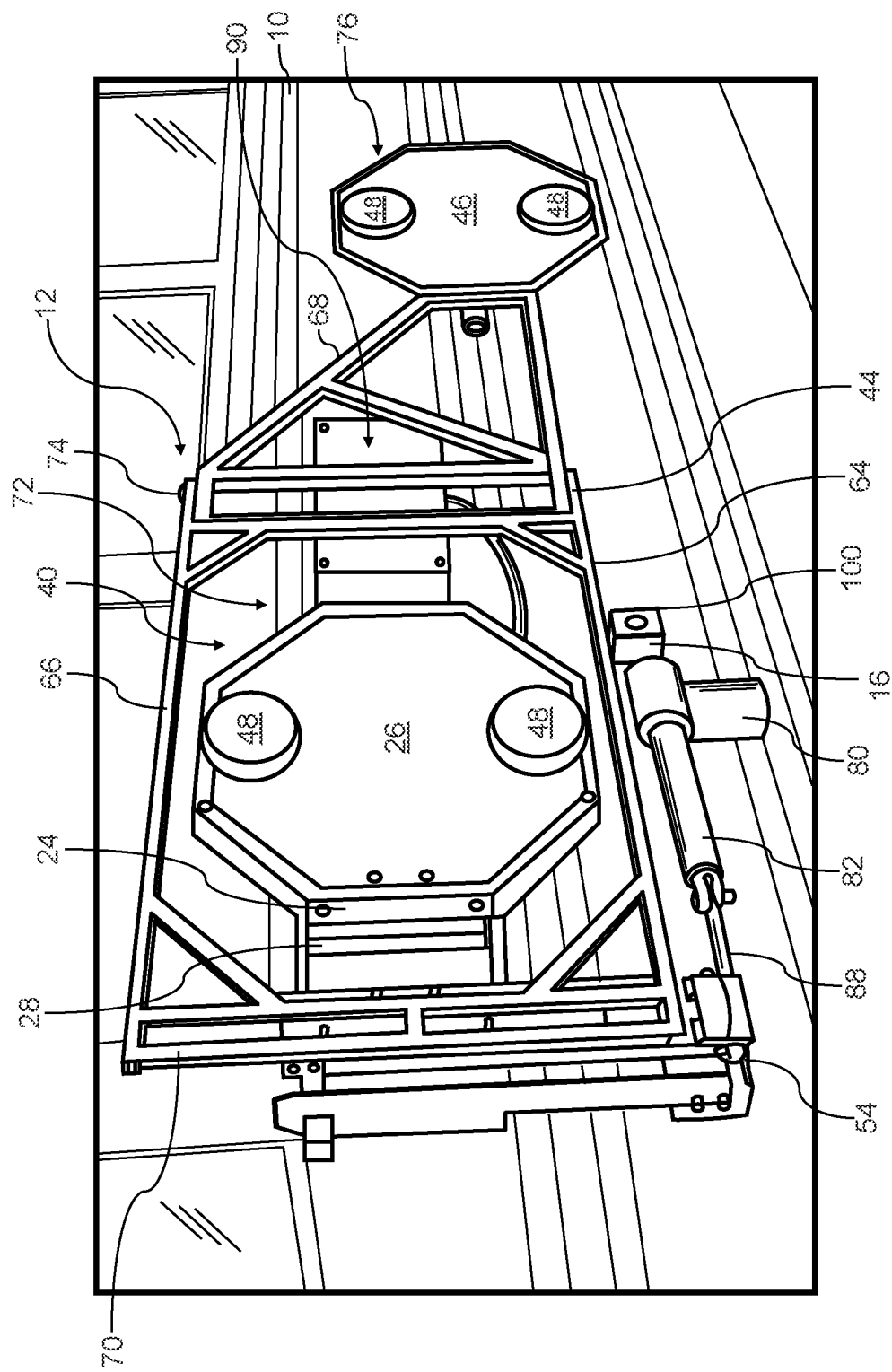
FIG. 1 illustrates a front side perspective view of an indicator arm apparatus according to one or more embodiments mounted on a vehicle and having the first indicator in a retracted position and the second indicator in a stored position.

The following description and figures are illustrative and are not to be construed as limiting. Numerous specific details are described to provide a thorough understanding of the disclosure. In certain instances, however, well-known or conventional details are not described in order to avoid obscuring the description. Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way.

Alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure.

PART NUMBERS

| | |
|---|---|
| 10 | Vehicle |
| 12 | Apparatus |
| 14 | Mount Unit |
| 16 | Base Plate |
| 18 | Enclosure |
| 20 | Lid |
| 22 | Fasteners |
| 24 | Short Pivotal Arm Assembly |
| 26 | First Indicator |
| 28 | First Hinge Unit |
| 30 | Fixed Portion |
| 32 | Swing Portion |
| 34 | First End |
| 36 | Second End |
| 38 | Fasteners |
| 40 | Retracted Position |
| 42 | Deployed Position |
| 44 | Long Pivotal Arm Assembly |
| 46 | Second Indicator |
| 48 | Lights |
| 50 | Channel |
| 52 | Wiring |
| 54 | Second Hinge Unit |
| 56 | Anchor Portion |
| 58 | Moving Portion |
| 60 | First End |
| 62 | Second End |
| 64 | Arm |
| 66 | First Segment |
| 68 | Second Segment |
| 70 | Frame Members |
| 72 | Open Section |
| 74 | Plastic Connectors |
| 76 | Stored Position |
| 78 | Extended Position |
| 80 | Drive Unit |
| 82 | Linear Actuator |
| 84 | Body |
| 86 | Piston |
| 88 | Operable Link |
| 90 | Control Unit |
| 92 | First Controller |
| 94 | Second Controller |
| 96 | Quick Release Electrical Connector |
| 98 | Coupling Unit |
| 100 | Sensor |
| 102 | Bar Shaped Extension Portion |
| 104 | Electroluminescent Paint Coating |

Overview

As seen in FIGS. 1-5, embodiments of a selectively deployable indicator arm apparatus 12 mountable to a vehicle 10 generally comprise a mount unit 14, a short pivotal arm assembly 24 secured to the mount unit 14, a long pivotal arm assembly 44 secured to the mount unit 14, a drive unit 80 operable to move either of the pivotal arm assemblies 24, 44, and a control unit 90 providing for selective operation of the drive unit 80. In embodiments, the short pivotal arm assembly 24 generally comprises a first indicator 26 and the long pivotal arm assembly 44 generally comprises a second indicator 46, each indicator 26, 46 pivotal between positions based on operation of the drive unit 80. In embodiments, the long pivotal arm assembly 44 pivots the second indicator 46 between a stored position 76 and an extended position 78 and the short pivotal arm assembly 24 pivots the first indicator 26 between a retracted position 40 and a deployed position 42. In embodiments, the second indicator 46 is disposed further away from the mount unit 14, and the vehicle 10 it is mounted to, when in the extended position 78 than the first indicator 26 when in the deployed position 42. In embodiments, the drive unit 80 operates to pivot one or both of the indicators 26, 46 based on user selections received by the control unit 90.

Thereby, the apparatus 12 secured on a vehicle 10 can selectively provide for the first indicator 26 to be pivoted to the deployed position 42, alone or in conjunction with the second indicator 46 being pivoted to the extended position 78. Pivoting out of both the first indicator 26 and the second indicator 46 provides superior notice because the second indicator 46 is disposed further from the vehicle 10 in its extended position 78. However, a user may select to only pivot out the first indicator 26, to still provide notice, in instances where there is not enough room to pivot both the first indicator 26 and second indicator 46 out. Accordingly, the apparatus 12 is more useful than just the standard stop arm or extended stop arm alone and provides for a greater variety of applicability and standardization or arm assemblies in a fleet of vehicles 10.

Elements

While various features and elements have been described in reference to particular embodiments and variations above, it is to be understood that no limitation of the scope of this disclosure is hereby intended. Thereby, elements and features might be utilized in any combination and for any embodiment to which it is particularly useful. To further promote understanding of the principles of the present disclosure, additional discussion related to particular elements of the present discussion is provided below.

Mount Unit

Figure 3:
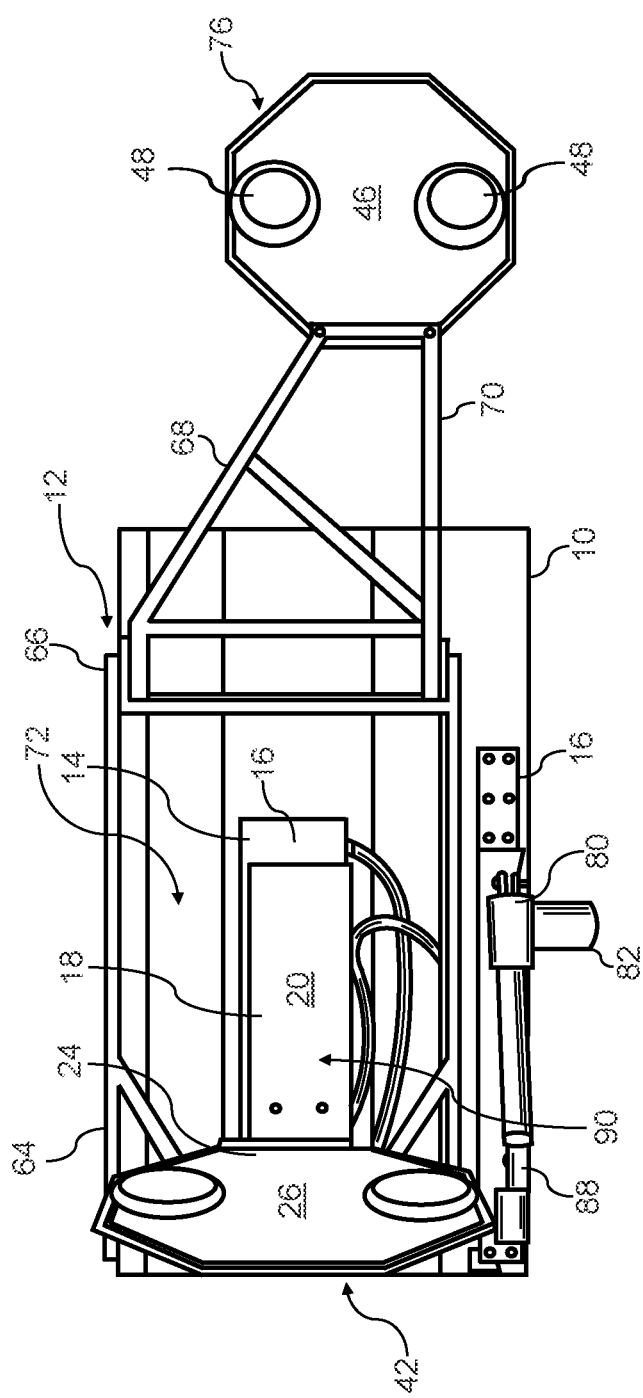
FIG. 3 illustrates a side elevation view of an indicator arm apparatus according to one or more embodiments mounted on a cutaway portion of a vehicle and having the first indicator in a deployed position while the second indicator is in a stored position.
Figure 5:
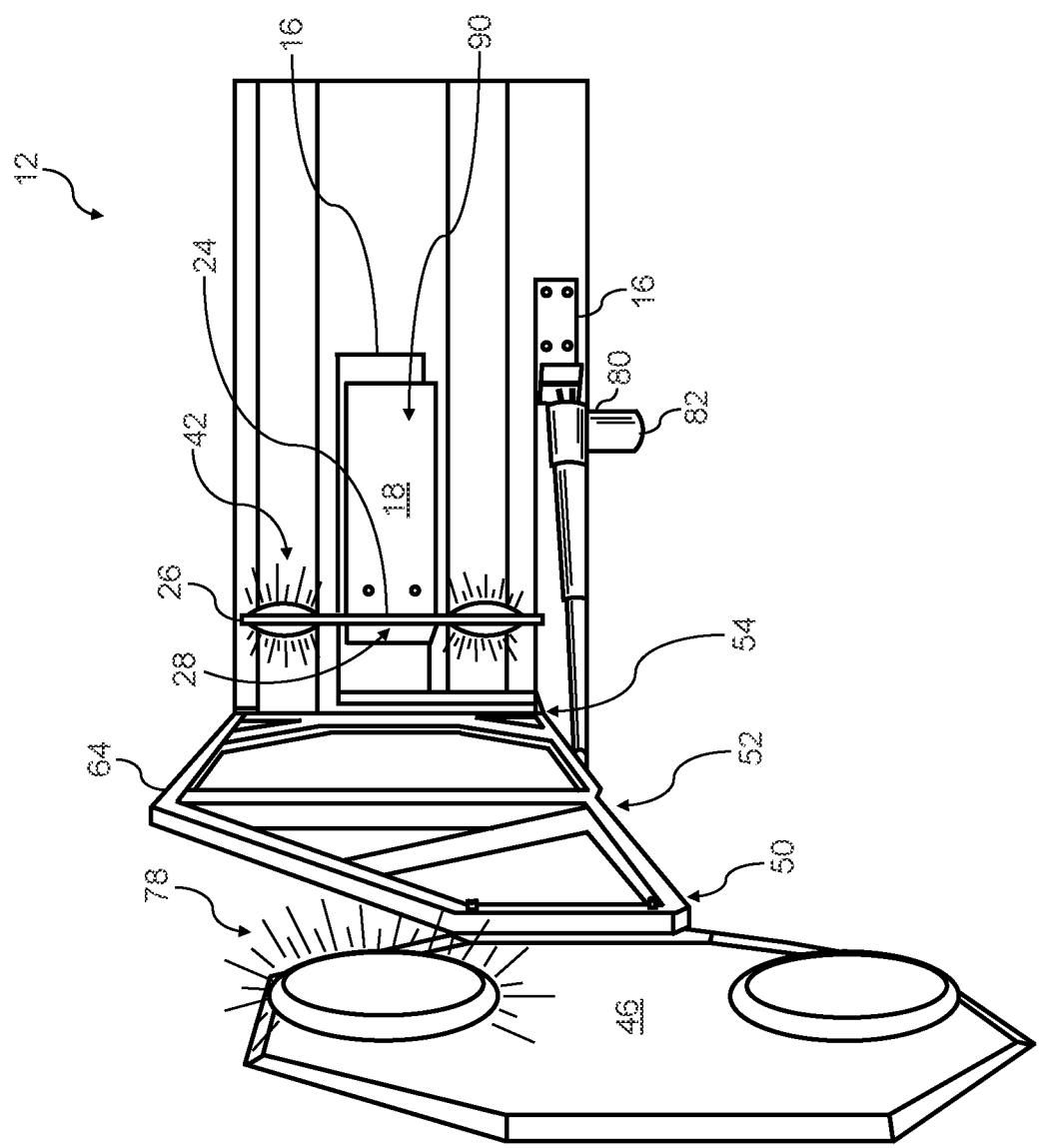
FIG. 5 illustrates a side elevation view of an indicator arm apparatus according to one or more embodiments mounted on a cutaway portion of a vehicle and having the first indicator in a deployed position and the second indicator in an extended position.
Figure 6:
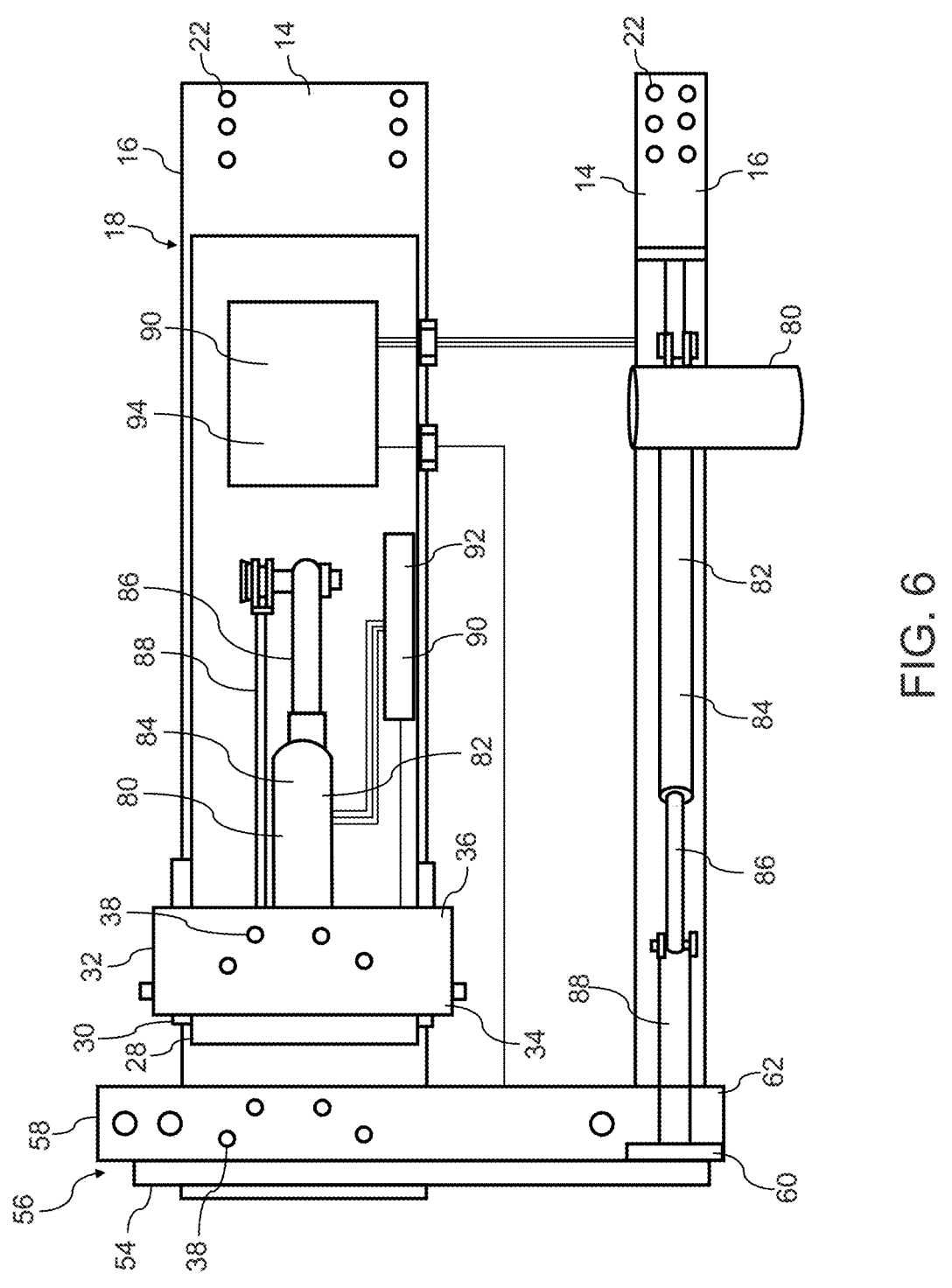
Figure 7:
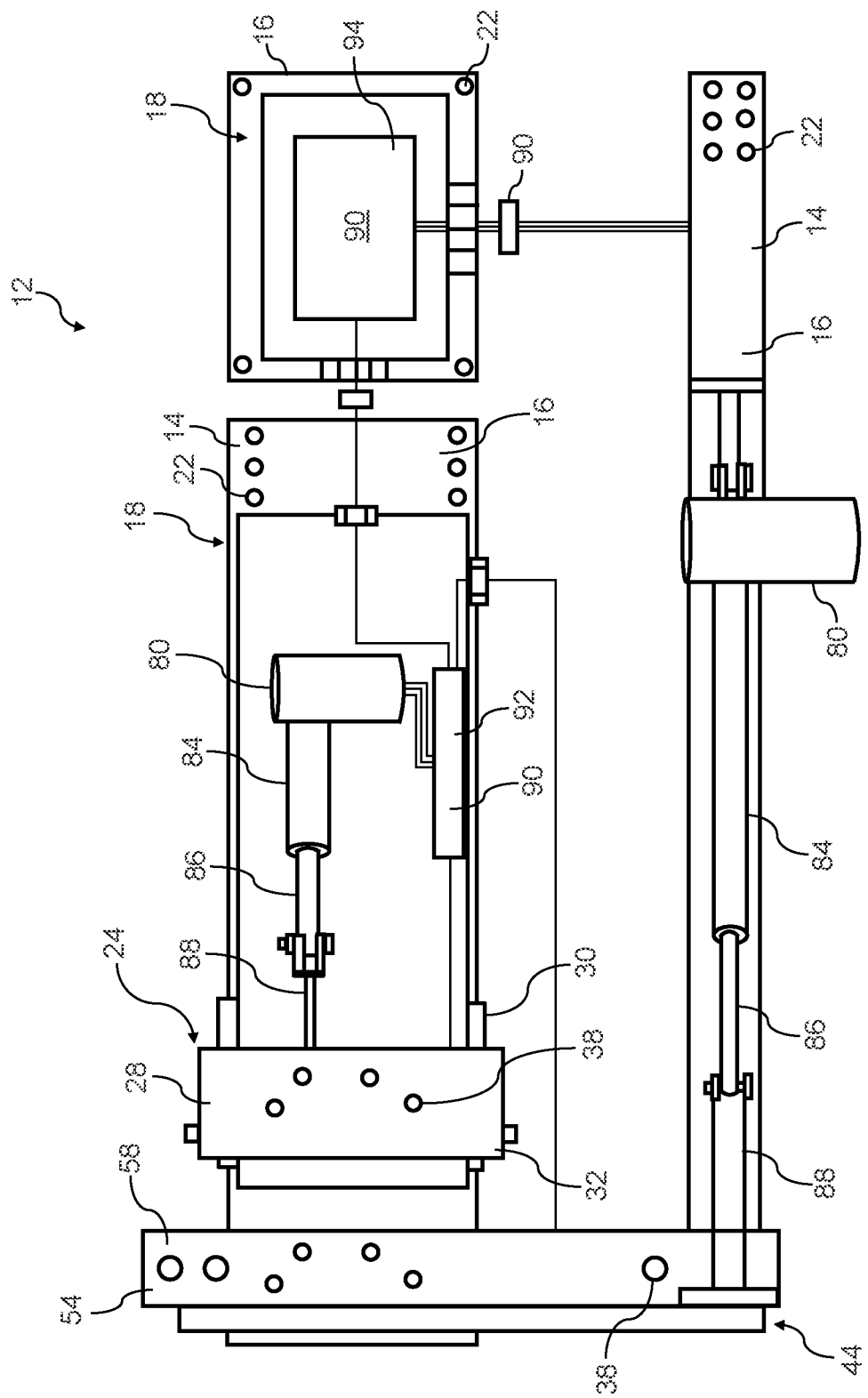
FIG. 7 illustrates a side elevation view of an indicator arm apparatus according to one or more embodiments having the first and second indicators removed and the lid removed on the enclosure affixed to the first base plate of the mount unit to aid illustration of the linear actuator drive unit including the arrangement of the piston so it extends away from the body and towards the hinge unit, and with the second drive unit affixed to a second separate base plate of the mount unit.
Figure 8:
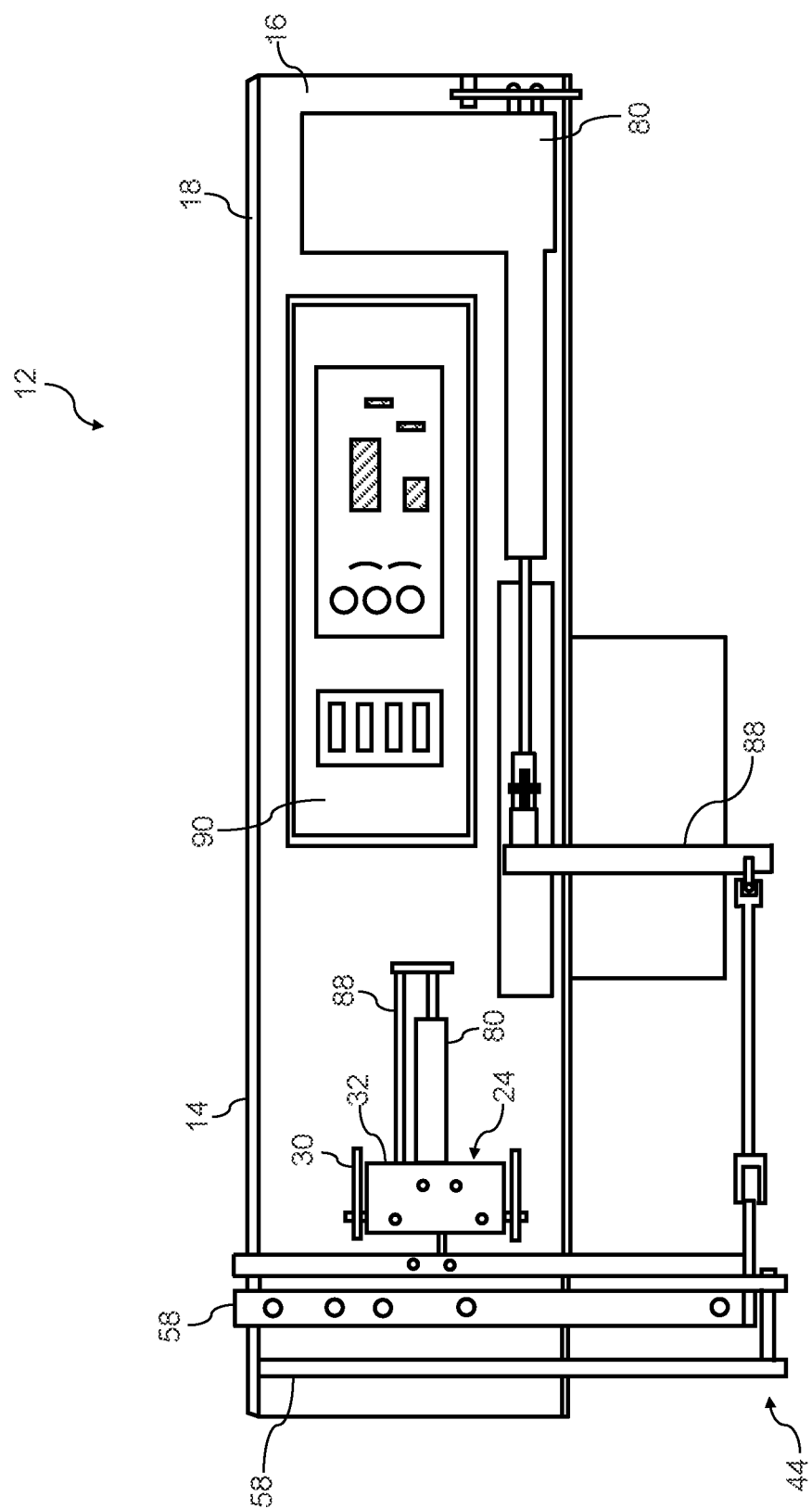
FIG. 8 illustrates a side elevation view of an indicator arm apparatus according to one or more embodiments having the first and second indicators removed and the lid removed on the enclosure to aid illustration of the two linear actuator drive units, each affixed to a hinge unit to provide pivotal movement of portions thereof.
Figure 9:
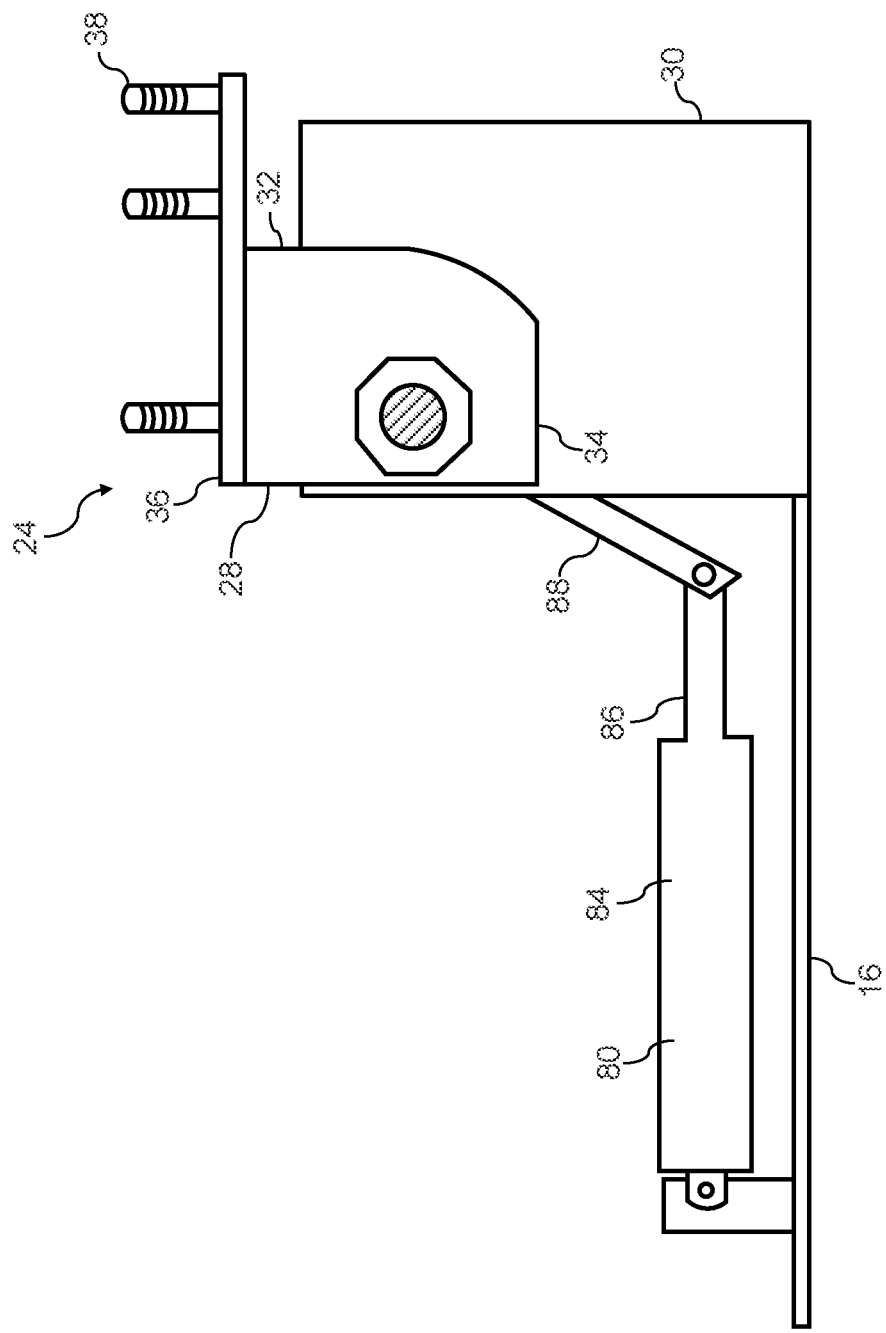
FIG. 9 illustrates a top view of an actuator and hinge unit of an indicator arm apparatus according to one or more embodiments.

In embodiments, the apparatus 12 comprises a mount unit 14 as shown in FIGS. 3, 5-8, and 10. The mount unit 14 comprises at least one base plate 16, in various embodiments. Multiple base plates 16 helps provide modularity to the apparatus 12. For example, FIGS. 3 and 5-6 show a mount unit 14 comprising two base plates 16, one base plate 16 upon which a drive unit 80 operably connected to the second hinge unit 54 of the long pivotal arm assembly 44 and one having an enclosure 18 housing a drive unit 80 and portions of a control unit 90. In one embodiment, the mount unit 14 comprises three base plates 16 as shown in FIG. 7, a base plate 16 having an enclosure 18 housing a portion of the control unit 90 and a drive unit 80 for the short pivotal arm assembly 24, a base plate 16 having a drive unit 80 for the long pivotal arm assembly 44, and a base plate having an enclosure 18 having a portion of the control unit 90 corresponding to the drive unit 80 for the long pivotal arm assembly 44. The use of multiple base plates 16 allows for the removable attachment of portions of the apparatus 12 to a vehicle 10. Indeed, as shown in FIG. 7, the wiring for the portion of the control unit 90 corresponding to the drive unit 80 for the long pivotal arm assembly 44 is affixed through quick release electrical connectors 96 to facilitate the addition, removal, and replacement the enclosure 18 and portions therein. Although the present figures show the portion of the control unit 90 corresponding to the drive unit 80 for the long pivotal arm assembly 44 as either in the enclosure 18 with the portion for the short pivotal arm assembly 24 or in a separate enclosure 18, there are also embodiments where such portion of the control unit 90 is disposed on a base plate 16 having the drive unit 80 for the long pivotal arm assembly 44. That is, there may be two enclosures 18, one for each drive unit 80 and portion of the control unit 90 associated with a particular pivotal arm assembly 24, 44.

In embodiments, enclosures 18 may be affixed to one or more of the base plates 16 associated with the mount unit 14. Each of these enclosures 18 house portions of the apparatus 12, and may include a removable portion, such as a lid 20 to provide easy access. In embodiments, each base plate 16 or enclosure 18 may further include fasteners 22 to affix the portions of the enclosure 18 to the base plate 16. In embodiments, each base plate 16 or enclosure 18 may also include fasteners 22 to affix the such portions to the vehicle 10. These fasteners 22 may comprise bolts, clips, or mating portions such that each portions may be securely affixed and, in embodiments, removably affixed.

Short Pivotal Arm Assembly

In embodiments, the apparatus 12 comprises a short pivotal arm assembly 24 that includes a first indicator 26 and a first hinge unit 28 to pivot the first indicator 26 from a retracted position 40, as shown in FIG. 1, to a deployed position 42, as shown in FIGS. 2-5. To facilitate the pivoting of the first indicator 26, the first hinge unit 28 comprises a fixed portion 30 and pivotally attached swing portion 32 as shown in FIGS. 6-10. In embodiments, the first indicator 26 is affixed to the swing portion 32, such as through fasteners 38. Indeed, in embodiments, the swing portion may be affixed at a first end 34 to the fixed portion 30, such as by an axle or pins that allow pivoting, and at a second end 36 to the first indicator 26. In embodiments, the first end 34 and second end 36 are opposed to one another.

In further embodiments, portions of the short pivotal arm assembly 24 may be removably affixed to portions of the mount unit 14, such as a base plate 16. Additionally, portions of the short pivotal arm assembly 24 may be affixed together. For example, the first indicator 26 may be removably affixed to the swing portion 32 of the first hinge unit 28. Moreover, the swing portion 32 of the first hinge unit 28 may be removably attached to the fixed portion 30 thereof. Accordingly, portions of the short pivotal arm assembly 24 may be removed, replaced, or changed to accommodate different uses. In embodiments, each of these portions may be affixed together through fasteners 38, similar in nature to the fasteners 22 associated with the mount unit 14.

In embodiments, the first indicator 26 may be disposed in a plane parallel to the vehicle 10 or mount unit 14 when in the retracted position 40, such as in FIG. 1. In further embodiments, the first indicator 26 may be disposed in a plane perpendicular to the vehicle 10 or mount unit 14 when in the deployed position 42, such as in FIGS. 2-5.

Long Pivotal Arm Assembly

Figure 2:
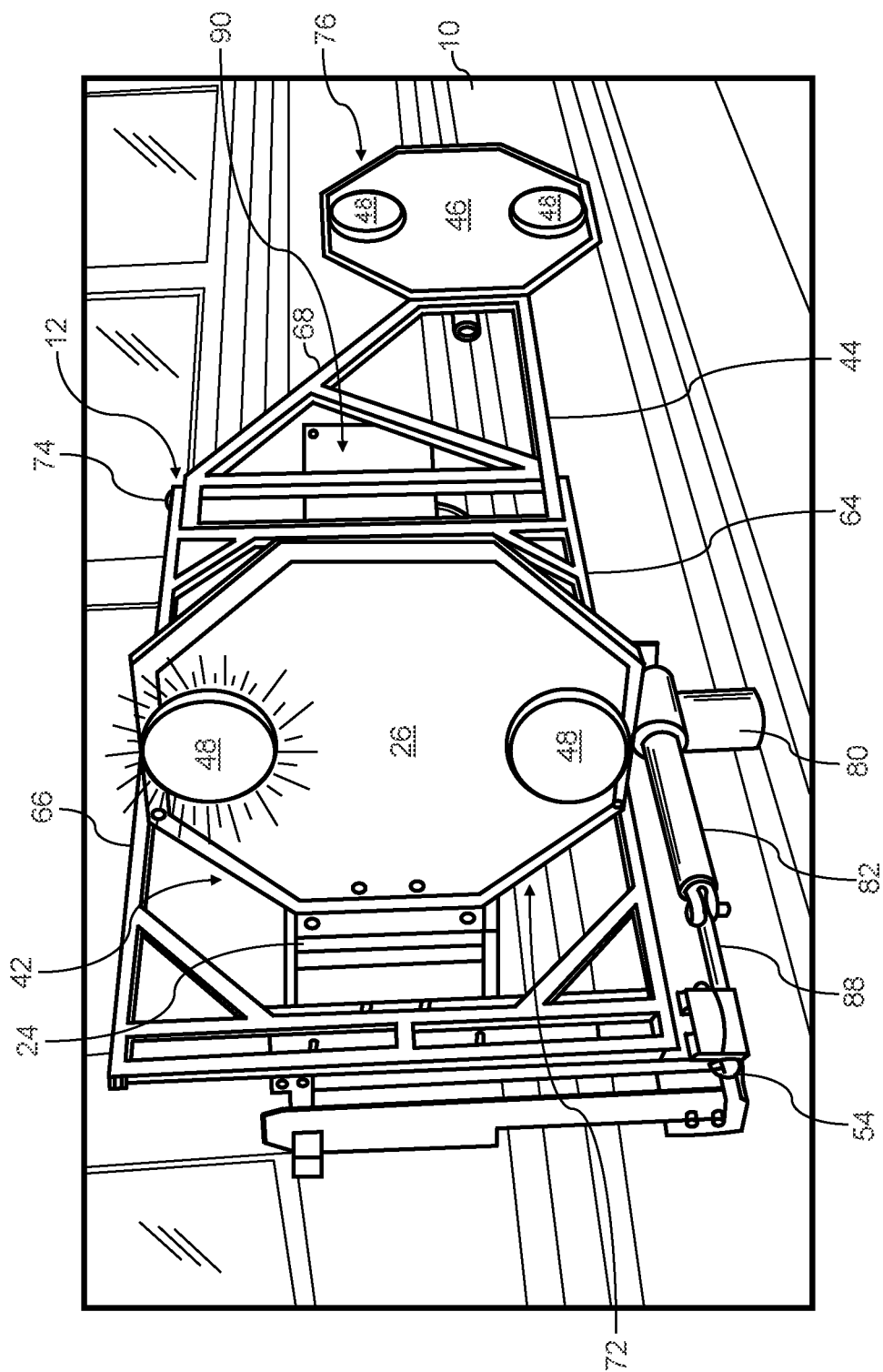
FIG. 2 illustrates a front side perspective view of an indicator arm apparatus according to one or more embodiments mounted on a vehicle and having the first indicator in a deployed position while the second indicator is in a stored position.
Figure 4:
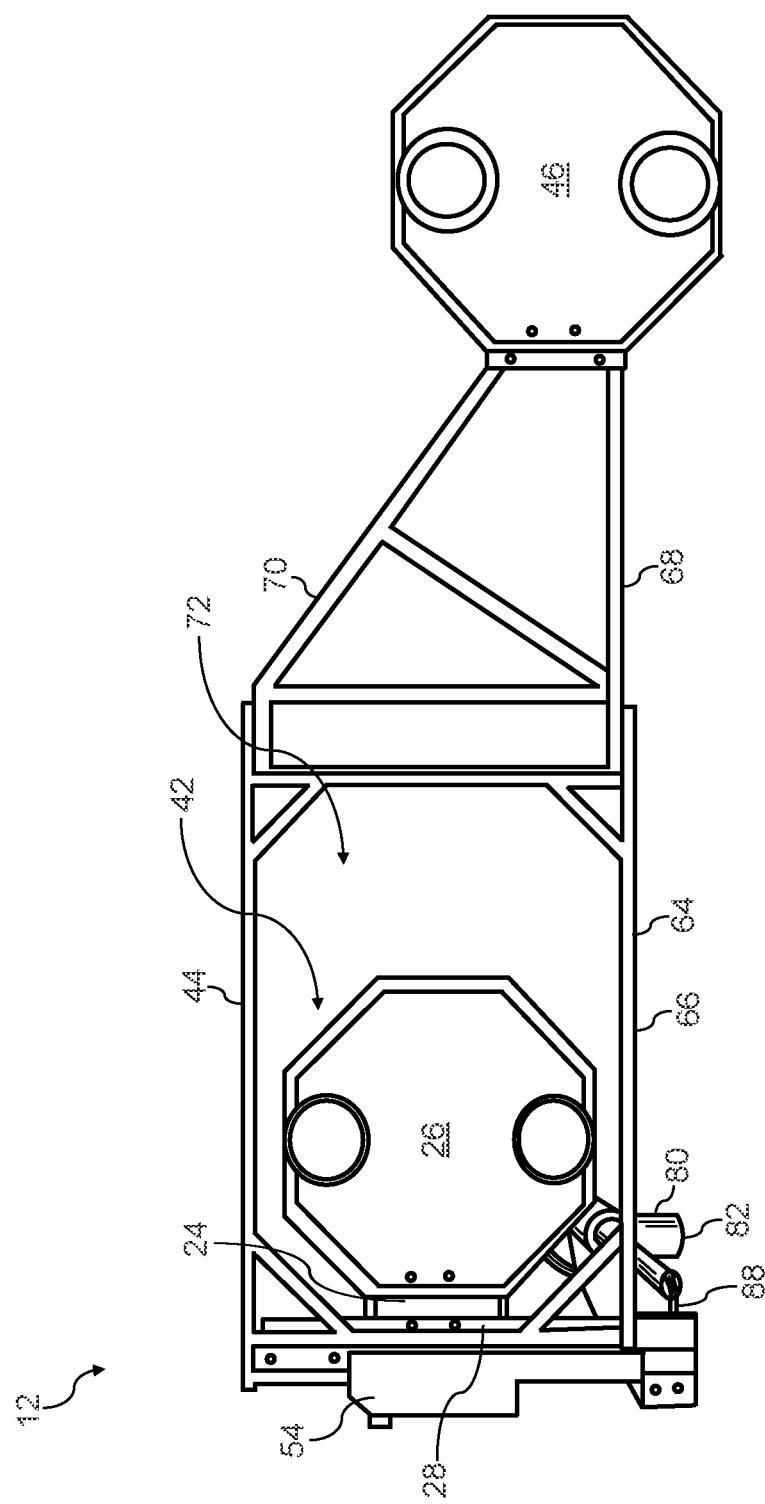
FIG. 4 illustrates a front view of an indicator arm apparatus according to one or more embodiments having the first indicator in a deployed position and the second indicator in an extended position.

In embodiments, the apparatus 12 comprises a long pivotal arm assembly 44 that includes a second indicator 46 and a second hinge unit 54 to pivot the second indicator 46 from a stored position 76, as shown in FIGS. 1-3, to an extended position 78, as shown in FIGS. 4-5. To facilitate the pivoting of the second indicator 46, the second hinge unit 54 comprises an anchor portion 56 and pivotally attached moving portion 58 as shown in FIGS. 6-8 and 10. In embodiments, the second indicator 46 is affixed to the moving portion 58, such as through fasteners 38. Indeed, in embodiments, the moving portion 58 may be affixed at a first end 60 to the anchor portion 56, such as by an axle or pins that allow pivoting, and at a second end 62 to the second indicator 46. In embodiments, the first end 60 and second end 62 are opposed to one another.

In further embodiments, portions of the long pivotal arm assembly 44 may be removably affixed to portions of the mount unit 14, such as a base plate 16. Additionally, portions of the long pivotal arm assembly 44 may be affixed together. For example, the second indicator 46 may be removably affixed to the moving portion 58 of the second hinge unit 54. Moreover, the moving portion 58 of the second hinge unit 54 may be removably attached to the anchor portion 56 thereof. Accordingly, portions of the long pivotal arm assembly 44 may be removed, replaced, or changed to accommodate different uses. In embodiments, each of these portions may be affixed together through fasteners 38, similar in nature to the fasteners 22 associated with the mount unit 14.

In embodiments, the second indicator 46 may be disposed in a plane parallel to the vehicle 10 or mount unit 14 when in the stored position 76, such as in FIGS. 1-3. In further embodiments, the second indicator 46 may be disposed in a plane perpendicular to the vehicle 10 or mount unit 14 when in the extended position 78, such as in FIGS. 4-5.

Figure 11:
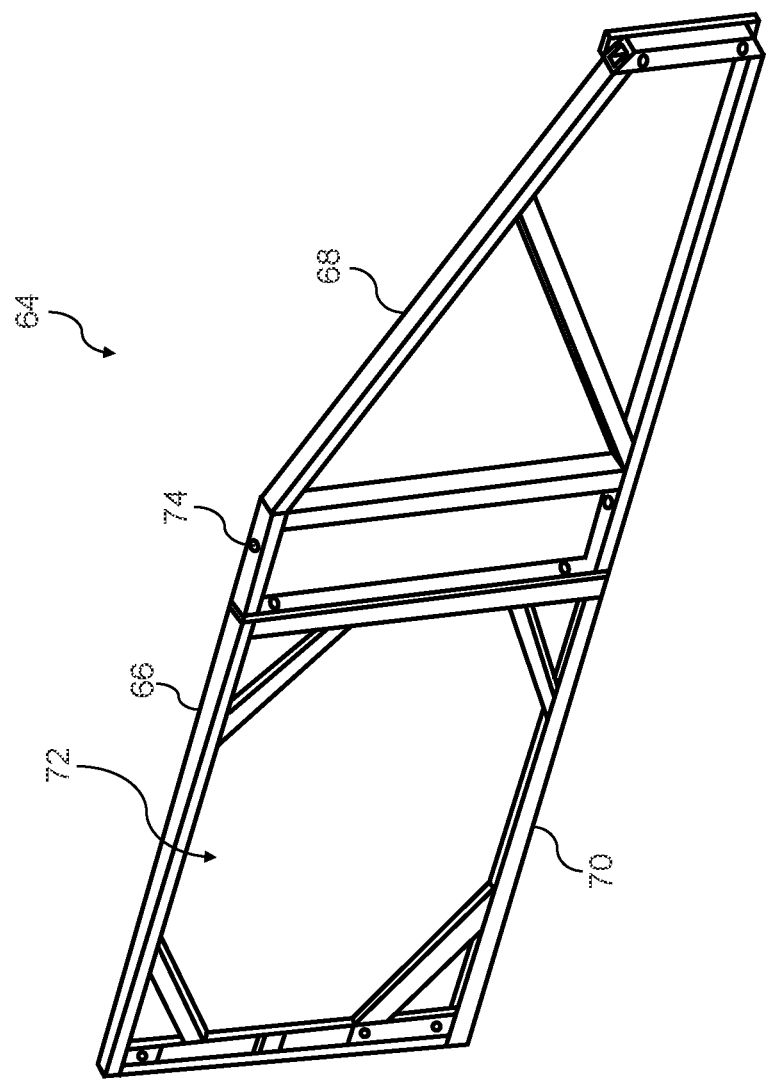
FIG. 11 illustrates a perspective view of an arm of an indicator arm apparatus according to one or more embodiments comprising two sections, each affixed together with plastic sheering fasteners and each arm having an end to be affixed to a hinge unit and an opposed end to be affixed to a second indicator.
Figure 12:
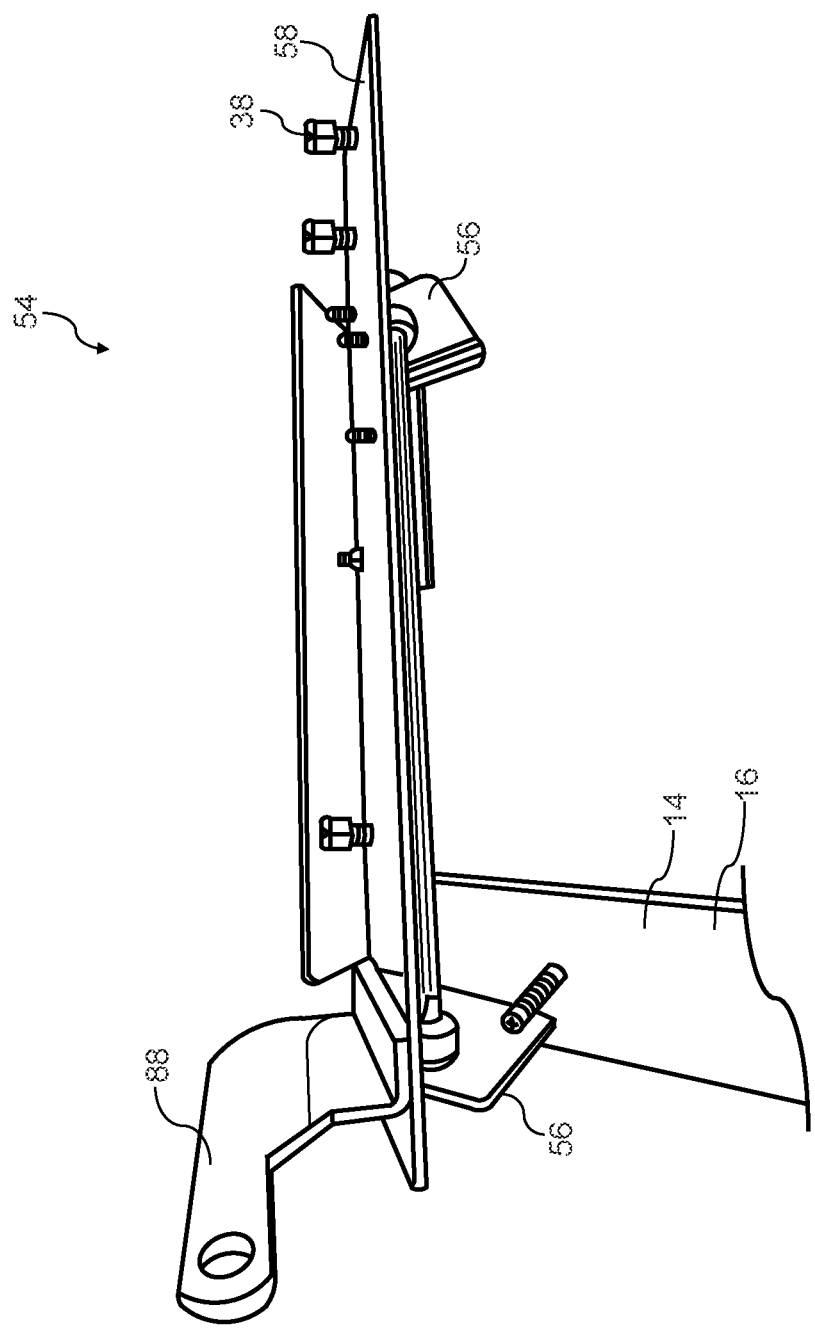
FIG. 12 illustrates a perspective view of a second hinge unit of an indicator arm apparatus according to one or more embodiments showing an anchor portion and a pivotally attached to the anchor portion and including integral bolts to removably affix the arm thereto.
Figure 13:
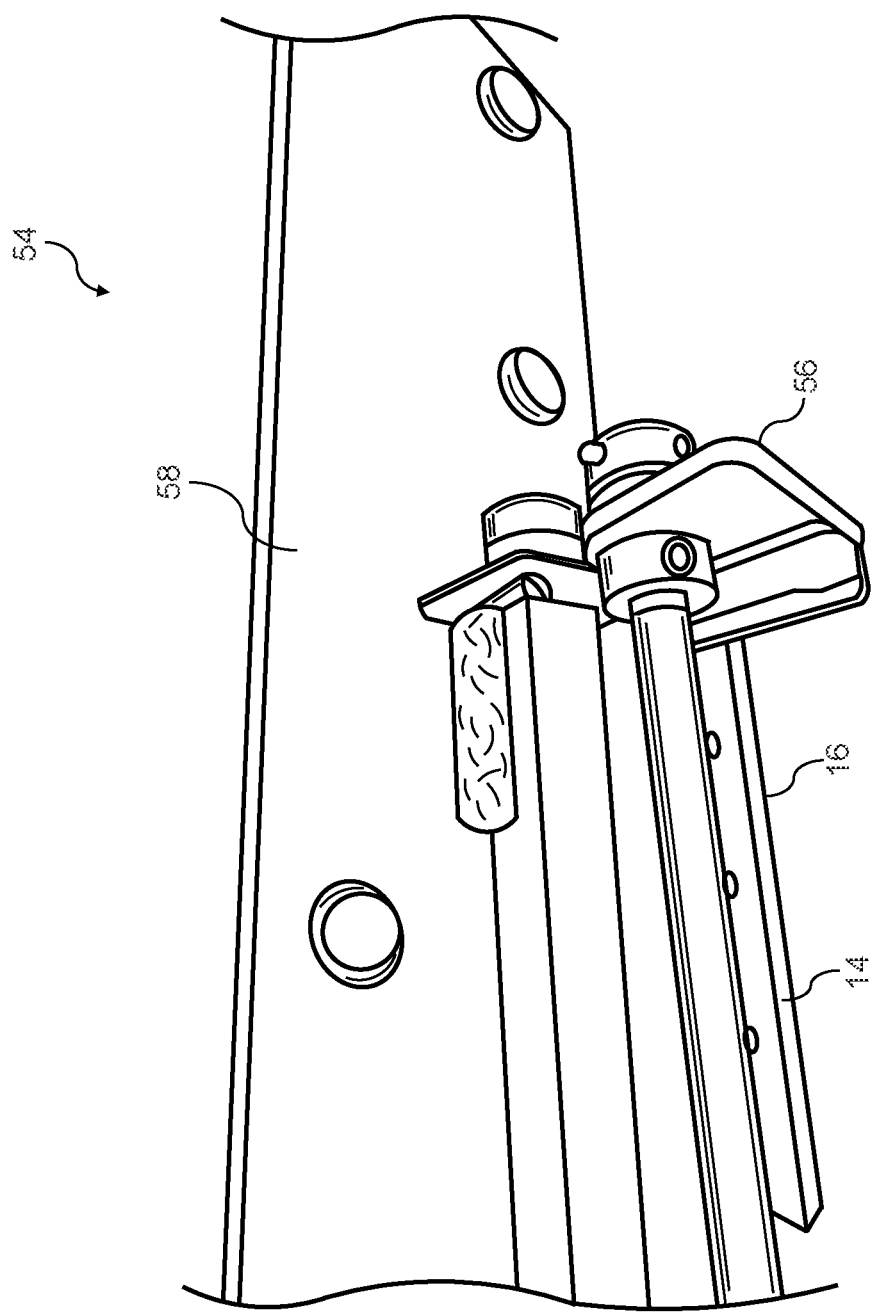
FIG. 13 illustrates a perspective view of a second hinge unit of an indicator arm apparatus according to one or more embodiments showing an axle extending through an anchor portion to which the moving portion is affixed such that it is pivotally attached.

In embodiments, the long pivotal arm assembly 44 comprises an arm 64, as in FIGS. 1-5, whereby the second indicator 46 is disposed in the extended position 78 a distance further from the vehicle 10 or mount unit 14 than the first indicator 26 in the deployed position 42. That is, in embodiments, the arm 64 ensures that the second indicator 46 is held further out from the vehicle 10 than the first indicator 26, as in FIGS. 4-5, to provide enhanced notice. In embodiments, the arm 64 comprises an outline of interconnected frame members 70, as in FIG. 11, defining an open section 72 in a portion thereof through which the first indicator 26 can pass when pivoting into the deployed position 42, as in FIG. 2. In additional embodiments, the arm 64 can comprise multiple segments affixed together, such as a first segment 66, defining the open section 72, and a second segment 68. In embodiments, each of the segments 66, 68 may be removably affixed together so that one of them may be replaced. In specific embodiments, the first segment 66 and the second segment 68 may be connected together through shearable (breakable) plastic connectors 74 providing the ability for the second segment 68 to break away from the first segment 66 when impacted with enough force. Thereby, a collision with the second segment 68, such as by a car, would allow that segment 68 to break away reducing the damage to the apparatus 12, as a result.

In further embodiments, some of the frame members 70 may be adjustable lengths to provide the ability of the arm to be adjustably sized. Thereby, the second indicator 46 may be disposed an adjustable distance away from a vehicle 10 or mount unit 14 to accommodate variation and increase usefulness of the apparatus 12. Moreover, replaceable portions of the arm 64 may have variable shape and designs of interconnected frame members 70 to accommodate different indicator options or purposes. For example, an apparatus 12 may utilize a larger second indicator 46, requiring a first segment 66 or second segment 68 having varied supporting cross bar designs for the interconnected frame members 70.

Figure 15:
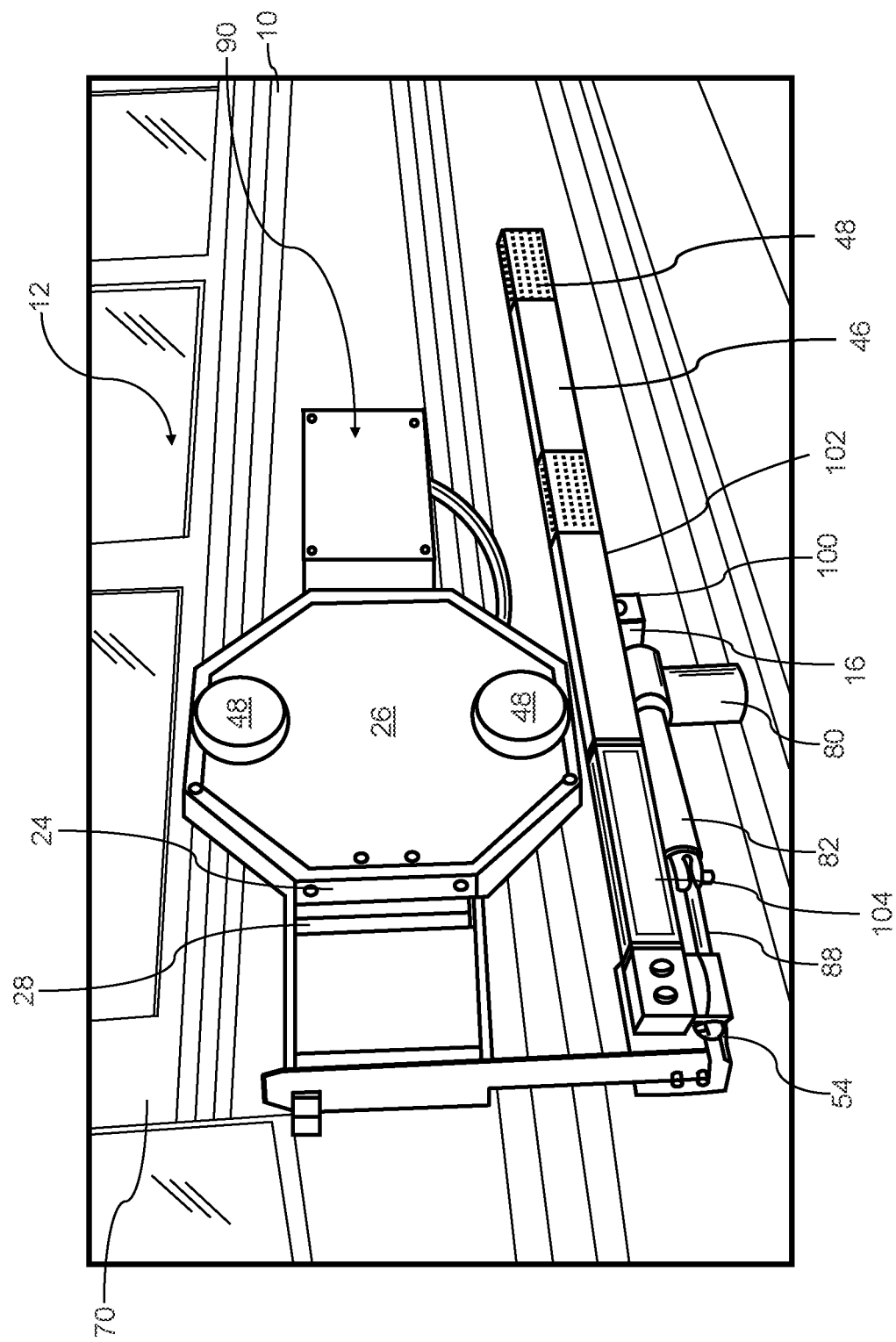
FIG. 15 illustrates a front side perspective view of an indicator arm apparatus according to one or more embodiments mounted on a vehicle and having the first indicator in a retracted position and the bar shaped second indicator in a stored position.

In certain embodiments, the second indicator 46 comprises a bar shaped extension portion 102, affixed to the second hinge unit 54, as in FIG. 15. In embodiments, the bar portion 102 may be affixed at one end to a moving portion 58 of the second hinge unit 54 and at an opposite end thereof to a specific sign portion. That is, the second indicator 46 may have a bar shaped extension portion 102 and a specific sign portion attached thereto protruding from the second hinge unit 54, in at least one embodiment. In a separate embodiment, as in FIG. 15, the second indicator 46 comprises the bar shaped extension portion 102 alone. The bar shaped extension portion 102, just as with any indicator 26, 46, may have various lights 48 and painted or reflective portions to enhance visibility. Moreover, any of the other portions of the apparatus 12, such as the first indicator 26, second indicator 46, or arm 64, may include LEDs, electroluminescent paint coatings 104, or other types of lights.

Lights

In embodiments, the apparatus 12 includes lights 48 disposed one or both of the first indicator 26 and second indicator 46, as in FIGS. 1-5. The lights 48 provide enhanced notice of the indicators and their intended communication by providing illumination of a respective indicator. These lights 48 may be affixed to the exterior of each indicator 26, 46, such as along one or both flat opposed planar surfaces of an indicator 26, 46 or may be disposed adjacent to an edge of one or both indicators 26, 46. In one embodiment, the lights 48 may be disposed within an indicator 26, 46 and provide illumination outward from an internal portion thereof through one or both flat opposed planar surfaces.

In embodiments, the lights may be battery powered and include a wireless receiver to activate and control illumination thereof. However, in embodiments wiring 52 may be disposed between a light 48 and a control unit 90 to activate and control illumination thereof. In embodiments, this wiring may be disposed within portions of the apparatus 12 to provide protection thereto. For example, wiring 52 for lights 48 disposed on a second indicator 46 may be disposed through channels 50 formed into or within frame members 70 of the arm 64. In embodiments, the lights 48 may be removably affixed to one or both of the indicators 26, 46 such that a defective light may be removed and fixed or replaced. Indeed, wiring 52 may incorporate one or more quick connectors 96 to provide for easy removal and replacement. Moreover, in certain embodiments, it is also foreseen that the entire arm 64 may have lights 48 integrated therein or attached thereto to provide even more enhanced notice.

In further embodiments, the lights 48 may be disposed along or affixed to any portion of the apparatus 12. For example, the bar extension portion 102, shown in FIG. 15, may have lights 48 installed thereupon. In certain embodiments, the lights 48 may be LED or electroluminescent in nature. However, in certain embodiments, portions of the apparatus 12, such as a second indicator 46 that is a bar shaped extension portion 102, may comprise an electroluminescent paint coating 104, in the alternative to or in addition to other lights 48. In embodiments, the electroluminescent paint coating 104 may be one or many coatings and, when part of an electrified circuit, provide illumination from portions have the electroluminescent paint coating 104. A control unit 90 may be in operable communication with the electrified circuit, prompting illumination of the electroluminescent paint coating 104, in embodiments. In at least one embodiment, the coatings may comprise a colored paint coating, over the electroluminescent paint coating 104, so that the illumination from portions of the apparatus 12 may have a particular color.

Drive Unit

In embodiments, the apparatus 12 includes at least one drive unit 80 to provide movement of one or both indicators 26, 46 associated with the apparatus 12 as in FIGS. 1-10. In various embodiments, the apparatus 10 includes two drive units 80, one associated with each pivotal arm assembly 24, 44. Each drive unit 80 may be removably affixed to a base plate 16 of a mount unit 14 in embodiments. Indeed, each drive unit 80 may be affixed to a separate base plate 16 from another in embodiments. In at least one embodiment, a drive unit 80 may be disposed within an enclosure 18 to provide protection thereto. However, in embodiments, a drive unit 80 may be disposed outside of an enclosure, particularly if such drive unit 80 is weather resistant. In still further embodiments, a drive unit 80 may be removably affixed to a base plate 16 of a mount unit 14 to allow for removal or replacement thereof.

In additional embodiments, each drive unit 80 may be pneumatic, hydraulic, magnetic, or electric in nature and may interconnect with a respective system of a vehicle 10 to provide it operable power. However, it is foreseen that a drive unit 80 might utilize virtually any of a variety of types to generate motion in an indicator 26,46 through a respective assembly and specific mechanics of an operable link therebetween. In embodiments, a control unit 90 may be in operable communication with a drive unit 80 in a wired or wireless fashion. Moreover, the wiring, for power or communication, may incorporate quick release electrical connectors 96 to facilitate installation and repair in embodiments.

In specific embodiments, the drive unit 80 may be a linear actuator 82 having a piston 86 that extends and retracts into a body 84 to transmit work into pivotal arm assembly 24, 44, such as through a hinge unit 28, 54 and an operable link 88. Indeed, linear actuators utilized 82 may be of an electromechanical or electrohydraulic nature. Moreover, the linear actuator 82 may be disposed in an arrangement where a piston 86 extending from the body 84 thereof moves towards or away from a pivotal arm assembly 24, 44 in various embodiments. In further embodiments, the extension of a piston 86 away from a body 84 can cause movement of the first indicator 26 towards the deployed position 42 or the second indicator 46 towards the extended position 78. However, in embodiments, the retraction of the piston 86 into the body 84 can cause movement of the first indicator 26 towards the deployed position 42 or the second indicator 46 towards the extended position 78. The specific movement of each indicator 26, 46 with respect to an action of the drive unit 80 can depend upon the arrangement of the drive unit relative to the respective pivotal arm assembly and the operable link 88 thereto.

Operable Link

In embodiments, each drive unit 80 provides movement through an operable link 88, as in FIGS. 1-7. The operable link 88 may merely be a rod pivotally connected to a piston end and to a hinge unit 28, 54 in embodiments, such as in FIGS. 1-7. However, in certain embodiments, the operable link 88 can comprise one or more of a connecting rod, a torque drive link, a hinge shaft, and a drive bracket, as in FIG. 8. Thereby, the operable link 88 provides a force from the drive unit 80, such as from a piston 86, to a portion of a hinge unit, such as the swing portion 32 or moving portion 58, prompting its pivotal movement. The operable link 88, in embodiments, is capable of providing durability by reducing stress to portions thereof due to the operable link's 88 design and construction. Moreover, the operable link's design and construction can be based on the location, design, and arrangement of the drive unit 80 and respective hinge unit in embodiments. In certain embodiments, the operable link 88 may be constructed with portions designed to split, shear, or break under a predefined amount of force to reduce or prevent damage to a respective drive unit 80 or pivotal arm assembly 24. Indeed, the control unit 90 may be capable of monitoring power consumption or force to determine if such portions split, shorn, or broke and providing feedback to a user, such as through a light in communication with the control unit 90.

Control Unit

In embodiments, the apparatus 12 further includes a control unit 90 as in FIGS. 1-3, 5-8 and 10. The control unit accepts user input or signals indicating user selections and, through operable communication therewith, provides signals to a drive unit 80. In embodiments, the control unit 90 may include a separate first controller 92 for a drive unit 80 associated with the short pivotal arm assembly 24 and second controller 94 for a drive unit 80 associated with the long pivotal arm assembly 44. The control unit 90 may be configured to allow a user to prevent operation of one or more of the drive units 80 for at least a temporary period of time in embodiments. In embodiments, the control unit 90 is in operable communication with the lights 48 associated with each pivotal arm assembly 24, 44. Moreover, the control unit 90 may be configured, in embodiments, to provide feedback on operations to a user, such as through a graphical user interface or lights. For example, the control unit 90 may be capable of monitoring power consumption or force to determine the operation of a drive unit 80. In embodiments, each portion of a control unit 90 may be disposed within an enclosure 18 to ensure protection thereof.

In further embodiments, the control unit 90 may be disposed in wired or wireless operable communication with one or more of drive units 80, lights 48, or user input devices, such as switches, buttons, dials, or the like. Moreover, the control unit 90 may be connected, in a wired or wireless manner, with other systems associated with the apparatus 12. For example, the control unit 90 may be in operable communication with a coupling unit 98, as discussed below, or with a sensor 100, as also discussed below. Indeed, the control unit 90 may utilize signals from a sensor 100, in addition to user inputs, to generate signals for the drive unit 80 or coupling unit 98. In wired embodiments, portions of the control unit 90 wiring may include quick release electrical connectors 96 allowing for easier installation and repair.

Coupling Unit

Figure 10:
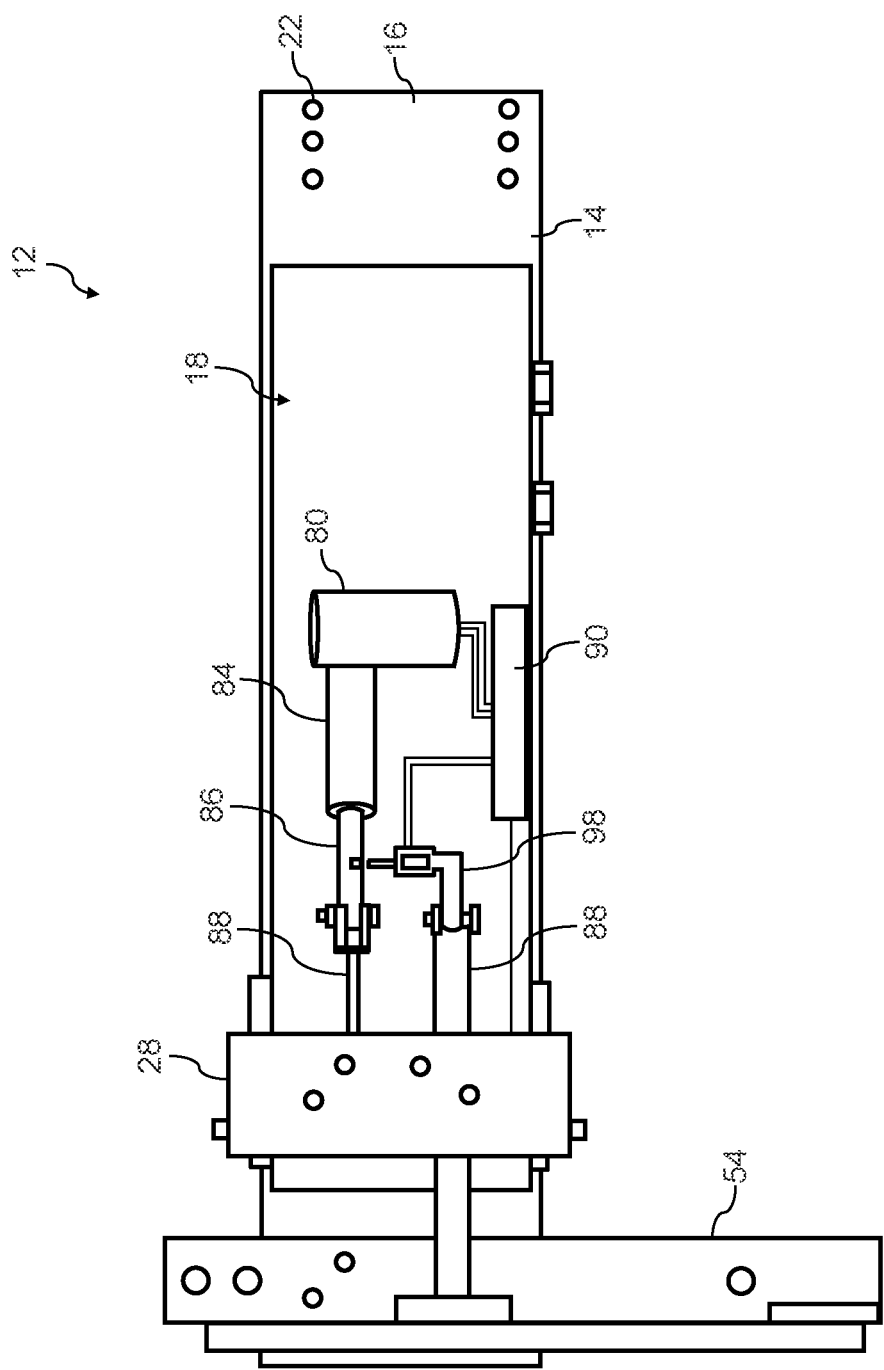
FIG. 10 illustrates a side elevation view of an indicator arm apparatus according to one or more embodiments having the first and second indicators removed and the lid removed on the enclosure to aid illustration of the linear actuator drive unit and a coupling unit to attach the first pivotal arm assembly and second pivotal arm assembly together so movement of one moves the other.

In various embodiments, the apparatus may include a coupling unit 98 as in FIG. 10. The coupling unit 98 connects portions of each pivotal arm assembly such that movement in one assembly also generate movement in the other in embodiments. For example, the coupling unit 98 of FIG. 10 would join an operable link associated with the second hinge unit 54 of the long pivotal arm assembly 44 to the piston 86 of a linear actuator 82 that is already affixed to an operable link associated with the first hinge unit 28 of the short pivotal arm assembly 24. In embodiments, the coupling unit 98 is selectively engageable, such as by being in operable communication with a control unit 90 to extend or retract a portion thereof to engage a portion of the drive unit 80. Although FIG. 10 shows a coupling unit 98 having a protrusion that mates with a recess on a piston 86, it is foreseen that the coupling unit 98 could engage and operable link 88 affixed to a drive unit 80 or to a pivotal arm assembly, in embodiments. Moreover, embodiments of the coupling unit 98 may utilize other mating features than a protrusion and recess in embodiments. For example, the coupling unit 98 could utilize a clamping feature to engage a portion of the apparatus. Moreover, while FIG. 10 shows the coupling unit 98 in communication with a control unit 90 associated with a drive unit 80, the coupling unit 98 could be in communication with a user input directly. Moreover, it is foreseen that the coupling unit 98 may be in wired or wireless communication with a control unit 90 or user input device in embodiments. In embodiments, utilization of a coupling unit 98 may allow for the use of a single drive unit 80.

Sensor

In embodiments, the apparatus 12 may include one or more sensors 100, as in FIG. 1. The one or more sensors 100 may provide the control unit 90 signals that may be utilized in operation of the apparatus 12. For example, the apparatus 12 might include an electric drive unit 80 and a current sensor and the control unit 90 may stop operation of that drive unit 80 based on the signals of the current sensor, such as in the case where movement of an indicator is prevented by damage or obstruction and the signals indicate the drive unit 80 is drawing more current than normal to move a respective indicator. In other embodiments, sensors 100 may include one or more of a capacitive sensor, a pressure sensor, an inductive sensor, a laser sensor to also determine if an obstruction or problem exists. For example, a laser sensor might be placed and utilized to determine when an obstruction or object is too close to the vehicle 10 to move the second indicator 46 of the long pivotal arm assembly 44 an extended position 78. Additionally, an accelerometer might be used in embodiments to indicate that an indicator 26, 46 in an extended or deployed position needs to be moved back to a stored or retracted position.

Heating Element

In further embodiments, the apparatus 12 also includes a heating element disposed in thermal communication with one or more of the drive units 80 and operably linked to a control unit 90 and a temperature sensor 100 in communication with the control unit 90, where the control unit 90 is configured to operate the heating element in response to the signal from the temperature sensor 100. For example, the heating element may be operated when the temperature sensor 100 signals a temperature below a set threshold, such as −5 degrees Fahrenheit. The heating element might be any type, shape, and structure known in the art. However, in at least one embodiment, the heating element might be a flexible sheet to allow for use in a confined area, such as within elements of the present apparatus 12.

Indicators

While the indicators 26, 46 shown in FIGS. 1-5 are identifiable as stop signs, it is also foreseen that different types of and messages on signs might be utilized. For example, a utility vehicle might have a sign that notifies drivers to get over or go around the utility vehicle. Indeed, while the first embodiment discloses an apparatus that is particularly useful for school buses, in other embodiments, the vehicle may be a public transportation, utility, emergency, train, subway, golfcart, trailer, or even a spaceship vehicle. For example, FIG. 14 shows various signs which might be one or more of the first indicator 26 or second indicator 46 and may be illuminated.

While various features and elements have been described in general above, it is to be understood that no limitation of the scope of this disclosure is hereby intended. Thereby, elements and features might be utilized in any combination and for any embodiment to which it is particularly useful.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive subject matter. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that when an element or layer is referred to as being "on" another element or layer, the element or layer can be directly on another element or layer, or intervening elements or layers may also be present. In contrast, when an element is referred to as being "directly on" another element or layer, there are no intervening elements or layers present. As used herein, the term "and/or" includes any and all combinations of one or more of the associated listed items.

Spatially relative terms, such as "below," "beneath," "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. Throughout the specification, like reference numerals in the drawings denote like elements.

Embodiments of the inventive subject matter are described herein with reference to plan and perspective illustrations that are schematic illustrations of idealized embodiments of the inventive subject matter. As such, variations from the shapes of the illustrations as a result, for example, of manufacturing techniques and/or tolerances, are to be expected. Thus, the inventive subject matter should not be construed as limited to the particular shapes of objects illustrated herein, but should include deviations in shapes that result, for example, from manufacturing. Thus, the objects illustrated in the figures are schematic in nature and their shapes are not intended to illustrate the actual shape of a region of a device and are not intended to limit the scope of the inventive subject matter.

The terminology used herein is for the purpose of describing particular embodiments only and is not intended to be limiting of the present inventive subject matter. As used herein, the singular forms "a," "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced items. Although any methods, devices, and materials similar or equivalent to those described herein can be used in the practice or testing of the presently disclosed subject matter, representative methods, devices, and materials are now described.

In the drawings and specification, there have been disclosed typical preferred embodiments of the inventive subject matter and, although specific terms are employed, they are used in a generic and descriptive sense only and not for purposes of limitation, the scope of the inventive subject matter being set forth in the following claims.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the forms herein disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed:

1. An indicator arm apparatus comprising:
    a mount unit comprising a first base plate and a second base plate, wherein each of the first base plate and second base plate are configured to be secured directly to a vehicle;
    a first pivotal arm assembly comprising:
        a first indicator,
        a first hinge unit comprising
            a fixed portion affixed directly to the first base plate, and
            a swing portion pivotally affixed at a first end to the fixed portion and an opposed second end affixed to the first indicator, wherein the swing portion is configured to pivot relative to the first base plate and the fixed portion,
        wherein the first hinge unit is configured to pivot the first indicator from a retracted position to a deployed position such that a portion of the first indicator is disposed further from the mount unit in the deployed position thereof;
    a second pivotal arm assembly comprising:
        a second indicator,
        a second hinge unit comprising
            an anchor portion affixed directly to the second base plate, and
            a moving portion pivotally affixed at a first end to the anchor portion and an opposed second end affixed to the second indicator, wherein the moving portion is configured to pivot relative to the second base plate and the anchor portion,
        wherein the second hinge unit is configured to pivot the second indicator from a stored position to an extended position such that a portion of the second indicator is disposed a distance from the mount unit in the extended position greater than the distance associated with the first indicator and the mount unit in the deployed position thereof;
    a first drive unit affixed to the first base plate and operably linked to the first pivotal arm assembly to move the first indicator between the retracted position and the deployed position;
    a second drive unit affixed to the second base plate and operably linked to the second pivotal arm assembly to move the second indicator between the stored position and the extended position; and
    a control unit in operable communication with the first drive unit and the second drive unit configured to provide signals to the first drive unit to selectively move the first indicator and configured to provide signals to the second drive unit to selectively move the second indicator;
    wherein the apparatus is configured allow operation in a first mode, a second mode, and a third mode,
    wherein the first indicator is disposed in the deployed position and the second indicator is disposed in the stored position in the first mode,
    wherein the first indicator is disposed in the deployed position and the second indicator is disposed in the extended position in the second mode, and
    wherein the first indicator is disposed in the retracted position and the second indicator is disposed in the stored position in the third mode.

2. An indicator arm apparatus of claim 1, further comprising an enclosure configured to affix to the first base plate and surround at least a portion of both the first drive unit and the control unit.

3. An indicator arm apparatus of claim 1, further comprising at least one sensor in communication with the control unit, wherein the control unit selectively operates one or more of the first drive unit and the second drive unit based on signals received from the at least one sensor and wherein the at least one sensor is configured to detect an obstruction disposed in a path of movement of the second indicator between the stored position and the extended position.

4. An indicator arm apparatus of claim 1, wherein the first drive unit comprises a linear actuator comprising a piston having a portion which may be extended out of or retracted into a body of the linear actuator and, wherein the first indicator moves from the retracted position to the deployed position as the portion of the piston retracts into the body of the linear actuator.

5. An indicator arm apparatus of claim 1, wherein the first drive unit comprises a linear actuator comprising a piston having a portion which may be extended out of or retracted into a body of the linear actuator and wherein the second end the swing portion pivots away from the first base plate when the piston is retracted into the body of the linear actuator.

6. An indicator arm apparatus of claim 1, wherein the second drive unit comprises a linear actuator comprising a piston having a portion which may be extended out of or retracted into a body of the linear actuator and, wherein the second indicator moves from the stored position to the extended position as the portion of the piston of the piston extends from the body of the linear actuator.

7. An indicator arm apparatus of claim 1, wherein the second drive unit comprises a linear actuator comprising a piston having a portion which may be extended out of or retracted into a body of the linear actuator and wherein the second end of the moving portion pivots away from the second base plate when the piston extends from the body of the linear actuator.

8. An indicator arm apparatus of claim 1, wherein the first indicator is removably affixed to the second end of the swing portion.

9. An indicator arm apparatus of claim 1, wherein the second indicator is removably affixed to the second end of the moving portion.

10. An indicator arm apparatus of claim 1, wherein the moving portion comprises an arm having an outline of interconnected frame members between the first end of the moving portion and the second end of the moving portion, the arm surrounding and defining an open section in a cross-sectional plane passing through the frame members;
   wherein the second indicator is affixed to one of the frame members at the second end of the moving portion on an opposed side of the open section from the first end of the moving portion; and
   wherein a portion of the first pivotal arm assembly is disposed through the open section when the apparatus is in the first mode.

11. An indicator arm apparatus of claim 10, wherein at least a portion of the frame members are configured to be adjustable such that the second indicator can be manipulated between a first distance and second distance from the anchor portion.

12. An indicator arm apparatus of claim 10, wherein the first indicator and second indicator comprise lights in operable communication with the control unit and at least a portion of the frame members define a channel carrying wires connecting the lights of the second indicator and the control unit.

13. An indicator arm apparatus of claim 10, wherein the arm has a first section having a side disposed adjacent the anchor portion of the second hinge unit and defining the open section; wherein the arm further has a second section disposed between the second end of the moving portion and the open section and wherein the second section is removably connected to the first section.

14. An indicator arm apparatus of claim 13, wherein the first section and second section of the arm are removably connected through shearable plastic connectors configured to provide separation of second section from the first section when at least one of the second section and second indicator is impacted with a predefined force.

* * * * *